United States Patent [19]
Jones

[11] 3,807,708
[45] Apr. 30, 1974

[54] LIQUID-AERATING PUMP
[76] Inventor: James H. Jones, Rt. 1 Box 134, Fordyce, Ark. 71742
[22] Filed: June 19, 1972
[21] Appl. No.: 263,811

[52] U.S. Cl............. 261/29, 261/DIG. 75, 261/93, 261/120, 210/169
[51] Int. Cl............................................. B01f 3/04
[58] Field of Search............210/220, 169; 261/29, 261/DIG. 75, 93, 120, 121 R, 121 M

[56] References Cited
UNITED STATES PATENTS

| | | | |
|---|---|---|---|
| 2,044,250 | 6/1936 | Kraut | 261/93 |
| 2,275,428 | 3/1942 | Haldeman | 261/121 M |
| 3,521,864 | 7/1970 | Welles, Jr. | 261/121 R X |
| 3,669,422 | 6/1972 | Nogaj | 261/120 X |
| 3,755,142 | 8/1973 | Whipple, Jr. | 261/93 X |

Primary Examiner—Willie G. Abercrombie
Attorney, Agent, or Firm—Ralph R. Pittman

[57] ABSTRACT

A liquid-aerating pump, particularly for fish farms, has an air-liquid mixing chamber mounted in a submergible intake and a double vane helical screw impeller structure adjacent to the opening into the pump casing to effect an additional step in combining liquid and air. The pump may be used either standing upright from a foot plate or as a self-propelled craft moving over a predetermined path while aerating the water on which it is floating.

10 Claims, 7 Drawing Figures

3,807,708
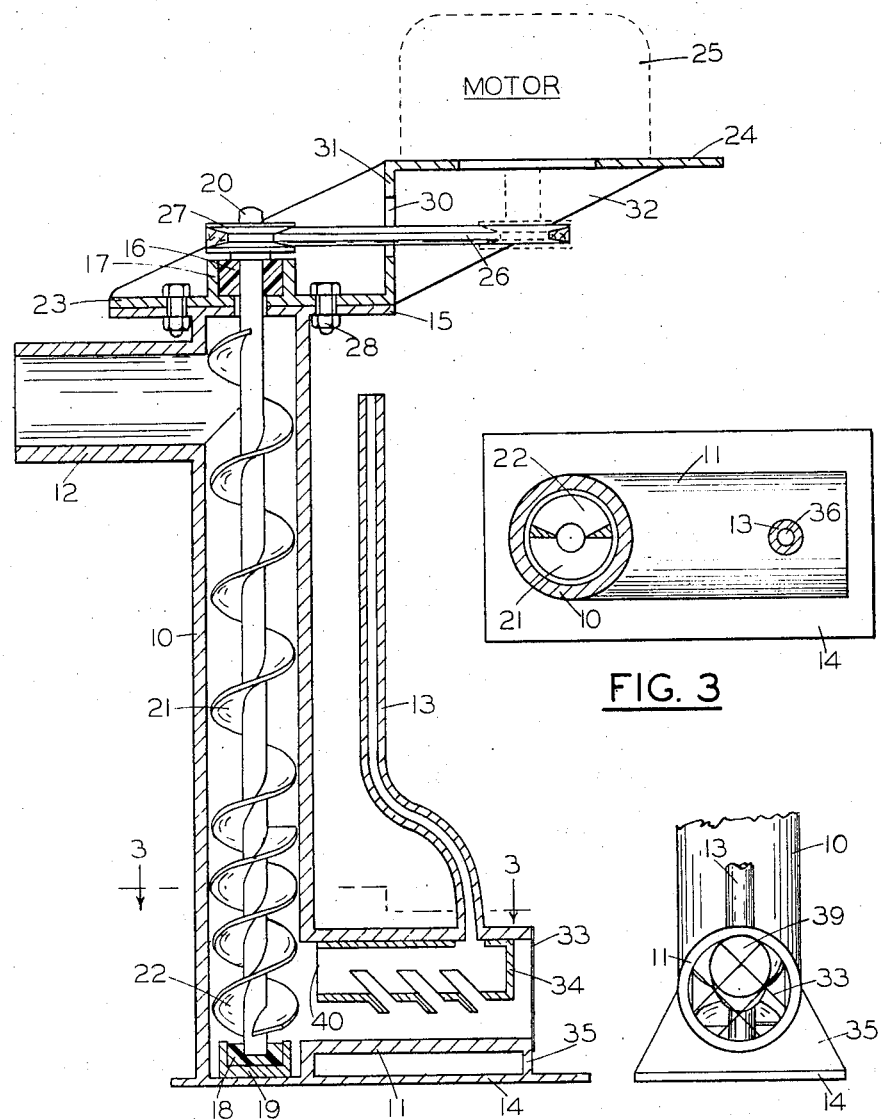
FIG. 1
FIG. 3
FIG. 4
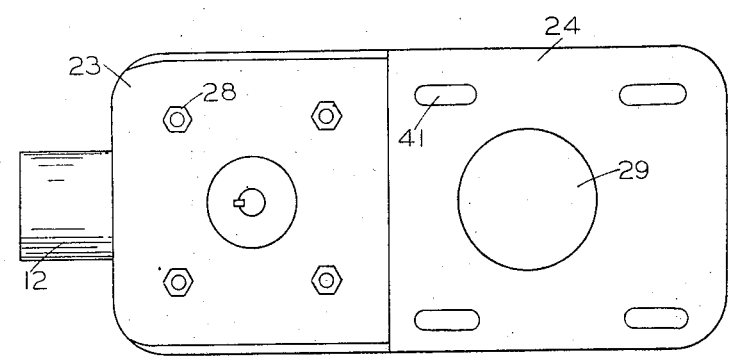
FIG. 2

LIQUID-AERATING PUMP

BACKGROUND

This invention relates generally to apparatus for combining gases and liquids, and more specifically to a water-aerating pump particularly adapted for use in connection with fish farming.

Lack of rainfall or oxygen-producing organic matter in a fish pond may retard the replenishment of the dissolved oxygen to such a degree that a fish crop will be lost, the fish dying from suffocation. During dry spells evaporation from fish ponds is often replaced by well water which is high in carbon dioxide and substantially devoid of oxygen, and the addition of this sort of water adds to the already excessive amount of carbon dioxide which has been produced by the fish.

Many live bait storage tanks and aquariums combined with aerators have been described. Such apparatus is not adapted for fish ponds covering acres of surface, and of course are not intended for such service. Equipment for supplying bottled oxygen to the water of fish farms has been described; also equipment located at the bottom of ponds for replacing top water with bottom water, some with accompanying aeration is found in the prior art.

SUMMARY OF THE INVENTION

The aerating pump described herein utilizes the principle of turbulent mixing to combine a liquid, such as water, with air drawn into the pump. The mixing begins adjacent to a submerged intake entrance opening, in an air-liquid mixing chamber mounted in the intake member. Air is supplied through an air intake tube extending above the surface of the water being treated. The mixing continues as the air-liquid combination is further blended by contact with a double screw impeller-turbulator near the lower end of an upstanding pump casing.

The aerated liquid is then lifted vertically by an impeller screw to discharge above the surface of the liquid under treatment. In shallow water the aerating pump may stand upright on a foot plate; for use in deep water an embodiment in the form of a floating self-propelled craft is provided, the craft being selectively adjustable to move as the aerating process proceeds over various lengths of circular paths, or alternately, along a rectilinear course.

The invention requires no delicate parts or expensive construction materials, the larger members being readily constructed by joining commonly available steel shapes, such as plates, strip and tubing, by welding. The suggested welded steel construction is well adapted to withstand rough handling.

BRIEF DESCRIPTION OF THE DRAWINGS

FIG. 1 is an elevational view of the pump, shown principally in section;
FIG. 2 is a plan view;
FIG. 3 is a sectional view along the line 3 — 3 of FIG. 1;
FIG. 4 is a fragmentary end view, looking into the intake member of the pump.

DESCRIPTION OF THE PREFERRED EMBODIMENT

Figure 5:
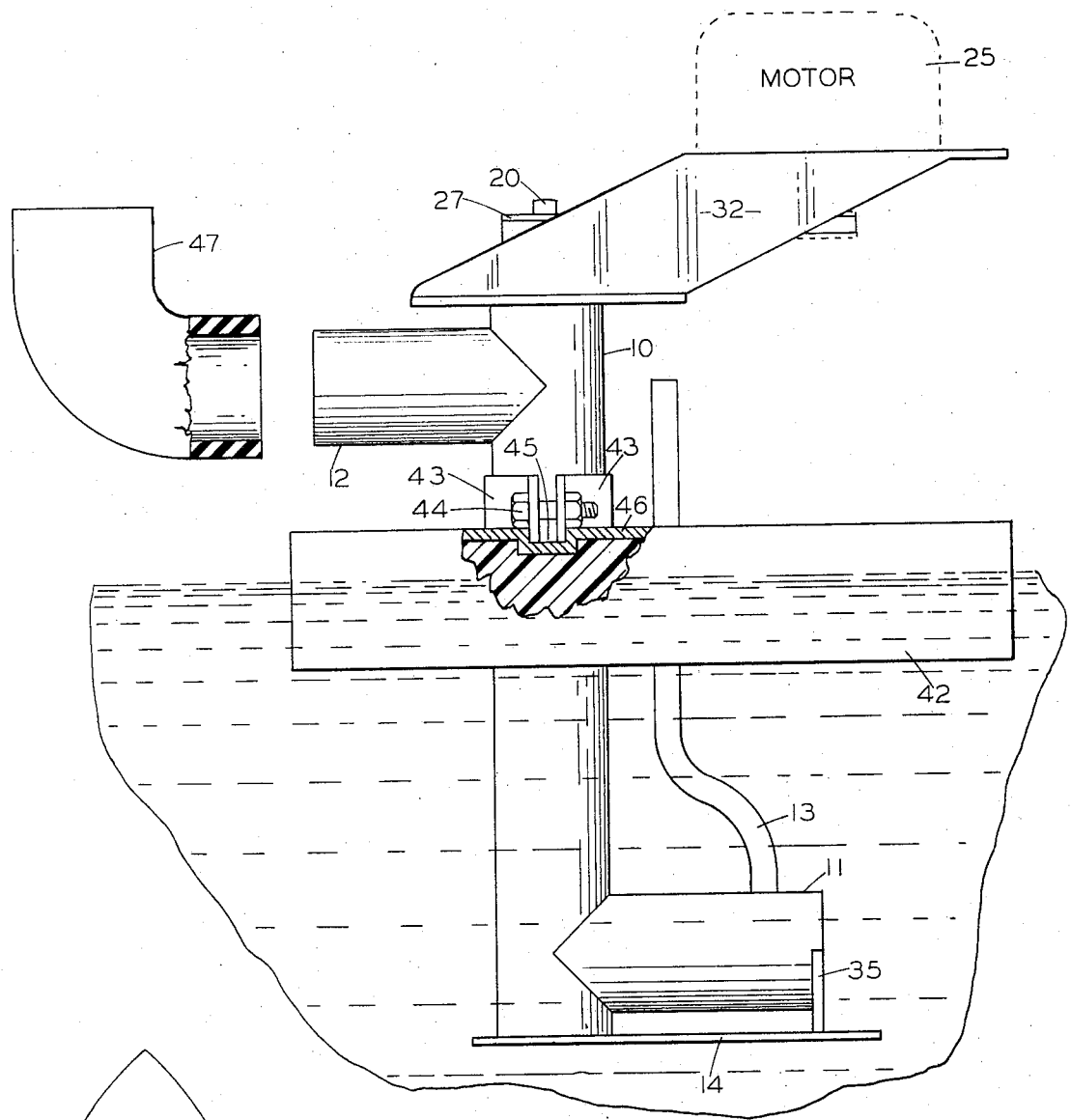
FIG. 5 is an elevational view of an aerating craft adapted for operation while moving over a body of water.

The construction shown in FIG. 1 is that of the aerating pump of the invention standing upright from a foot plate. The structure shown in FIG. 5 illustrates the invention on a float for operation in water too deep for the standing position.

Referring in detail to FIGS. 1 through 4, an elongate upstanding cylindrical pump casing 10 has, at the lower end of the casing, a tubular inlet member 11 projecting in one direction outwardly from the pump casing, and at the upper end of the casing, a tubular outlet or discharge member 12 projecting in the opposite direction. The simplest structure results when the casing, intake and discharge members have the same inside diameter.

The impeller shaft 20 extends axially downward through the pump casing 10 from an elevation above the upper end thereof, and is rotatably supported at its lower end by the bearing 18, the latter being held in place by the surrounding socket 19.

At the upper end of the casing 10 an outwardly extending flat mounting plate 15 is securely joined, to which a rearwardly extending motor mounting bracket is removably attached by the fasteners 28. The motor mounting bracket includes a first horizontally extending plate 23 in registration with the mounting plate 15, a second horizontally extending plate 24 disposed at an elevation above the first plate 23 and extending rearwardly therefrom, and a vertical wall 31 joining the rear margin of the first plate 23 to the forward margin of the plate 24. A pair of stiffening side plates 32 are rigidly joined to the respective lateral margins of the plates 23 and 24.

A motor 25, which may be either an electric or a fuel-burning motor, may be mounted over the slots 41 of the upper plate 24, with an extended shaft passing vertically downward through the central opening 29 in the upper plate, a driving pulley being secured to the end of the motor shaft for rotation in a horizontal plane.

A driven pulley 27 is keyed to the outstanding upper end of the impeller shaft 20, in horizontal alignment with the pulley of the driving motor, and the power transmission belt 26, which passes through the opening 30 of the wall 31, is adapted to deliver power to rotate the impeller shaft. Between the pulley 27 and the upper casing plate 15 a bearing 16 and the associated bearing socket 17 are interposed, for maintaining the desired axial alignment of the impeller shaft 20 within the pump casing 10. Nylon has been found to be one suitable material for both the upper and lower bearings.

The impeller has long and short helical impeller screws 21 and 22 spiraled around and rigidly secured to the shaft along the entire length of the impellers, the vane of each impeller screw, except for marginal rotational clearance, extending radially to the interior vertical surface of the casing 10. The long impeller screw 21 extends within the casing from an elevation above the discharge opening to an elevation below the intake opening, both the diameter and the pitch of the impeller screw being substantially equal to the diameter of the casing. The short impeller screw 22 extends upwardly from a point on the shaft diametrically opposed to the lowermost portion of the long impeller screw, spiraling upwardly around the shaft with the same diameter and pitch as that of the long impeller screw to an elevation of not more than one-half of the length of the long impeller screw.

The rearwardly extending foot plate 14 provides a support for the unit while standing on a flat surface. The foot plate is located under the tubular liquid intake 11, and the outer end of the latter is rigidly joined to the foot plate by the vertically extending outer support plate 35. A screen 33 is disposed over the outer end of the liquid intake to prevent the entrance of solid objects.

Figure 6:
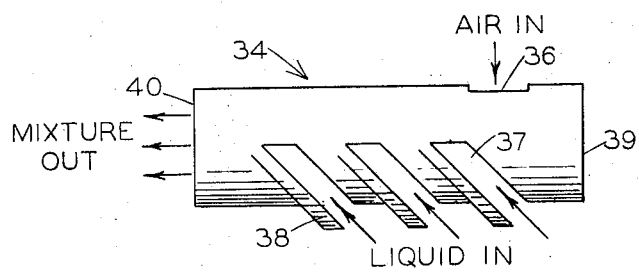
FIG. 6 is a side elevational view of the liquid-air mixing chamber, drawn to a larger scale than that in FIG. 1.

An air-liquid mixing chamber 34, in the shape of a hollow cylinder, is secured along the top inner surface of the intake 11, the chamber being closed at the end adjacent to the intake screen by the end closure 39, and opening at the other end into the pump casing, as indicated at the numeral 40 in FIG. 6.

A series of rearwardly and downwardly projecting baffles 38 are disposed along the lower outer surface of the mixing chamber, in position to deflect liquid moving through the intake upward into the mixing chamber through the slotted openings 37. The lower ends of the baffles terminate at an elevation of not less than one-half the inside diameter of the intake tube; e.g., if the intake tube has a diameter of 3 inches, the lowermost ends of the baffles are not more than 1½ inches above the lowermost inner surface of the intake member.

Adjacent to the closed end of the mixing chamber an air opening 36 provides for the entrance of air into the chamber from the upwardly extending tubular air intake 13, the air being drawn into the chamber in response to movement of liquid, e.g., water, along the liquid intake member. The rotation of the double-vane portion of the impeller structure turbulently further blends the air-water mixture as it leaves the intake member, thus effecting a supplementary solution of the oxygen component of the air with the water.

An embodiment of the invention for flotation operation on a body of water, such as a fish farm pond, is illustrated at FIG. 5. A float member 42, which may be composed of polystyrene foam, supports the aerating pump at a selective intake depth, determined by adjusting the position of the clamping members 43 along the casing as desired, and tightening the clamping bolts 44.

If the driving motor is operating and the craft is freely floating in still water, it will traverse a rectilinear path while pumping aerated water. The movement of the craft is caused by the cumulative push-pull jet effect of water moving through the pump, the discharge acting to push the craft, and the intake coacting to pull the craft in the same direction.

The craft may also be directed along a circular path by fitting the angular rubber nozzle 47 over the end of the discharge tube and deflecting the discharge in a sidewise direction. The size of the circular path may be adjusted by suitable alterations in the direction of discharge. To preclude movement of the pump with respect to the associated float when the craft is moving along a circular path, the upper surface of the float adjacent to the pump casing is in the form of an aluminum plate 46 which is provided with a rectanular recess 45 into which the respective outstanding arms of the clamping members 43 are fitted.

Figure 7:
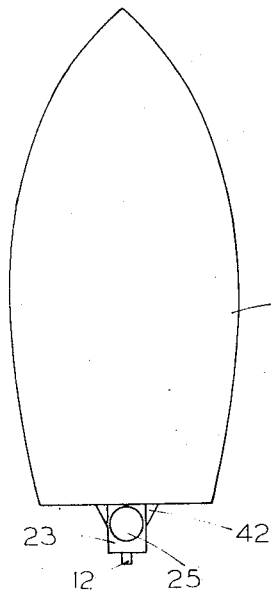
FIG. 7 is a plan view of a boat with the floating craft in position to move the boat as the pump operates.

The flotation embodiment shown in FIG. 5 may also be used to propel a boat, either by pulling or pushing it. FIG. 7 illustrates the aerating pump engaged with the stern of the boat 38.

In operation, the motor or engine rotates the impeller assembly in a clockwise direction viewed from above, and the rate of discharge is determined by the speed of rotation. As the impeller assembly rotates, the short spiral vane coacts with the long spiral vane, between the convolutions of which it is interlaced, to not only function as a turbulator but also to increase the quantity of liquid pumped at any operating speed.

What is claimed is:

1. A submerged-intake liquid-aerating pump comprising an upstanding cylindrical casing, tubular liquid intake and discharge members communicating with said casing, the intake member projecting radially from the lower end of said casing and the discharge member projecting radially from the upper end of said casing in the direction diametrically opposed to the direction of said intake member, impeller means rotatably mounted within said casing and adapted to move liquid from said intake member to said discharge member, an air-liquid mixing chamber mounted within said intake member and partially filling the opening therethrough, an air intake opening communicating with said mixing chamber, and a tubular air intake member merging with said air intake opening and extending upwardly along said casing to an elevation adjacent to the axis of the tubular discharge member.

2. The liquid-aerating pump as claimed in claim 1, in which the impeller means includes a shaft axially coextensive with said casing and a first long vane defining a helical screw spiraled edgewise along the surface of said shaft between the intake and discharge members.

3. The liquid-aerating pump as claimed in claim 1, in which the casing, the intake member and the discharge member are hollow cylinders equal in internal diameter.

4. The liquid-aerating pump as claimed in claim 2, wherein the pitch of the helical screw is substantially equal to the inside diameter of the casing.

5. The liquid-aerating pump as claimed in claim 2, wherein a second short vane defining a helical screw is spiraled edgewise along the surface of a lower portion of said shaft, the pitch of said second vane being equal to the pitch of said first vane.

6. The liquid-aerating pump as claimed in claim 5, wherein the lower portion of the shaft over which said second vane is disposed extends upwardly from the lower end of the shaft for a distance less than one-half the length of the casing, and said second vane defines a path lying equidistant between the convolutions of said first vane.

7. The liquid-aerating pump as claimed in claim 6, wherein said second vane is disposed adjacent to the junction of said intake member with said casing.

8. The liquid-aerating pump as set forth in claim 1, wherein said air-liquid mixing chamber comprises a horizontally disposed cylinder open at one end and closed at the other end, said cylinder extending longitudinally along the upper interior surface of said intake member, the closed end of the cylinder being located adjacent to the outer end of the intake member, a plurality of upwardly and inwardly sloping slots extending through the wall of the cylinder from the bottom surface thereof, and a baffle associated with each slot and effective to direct liquid moving along said intake member upwardly into said cylinder, each baffle projecting outwardly along the front margin of the associated slot.

9. The liquid-aerating pump as claimed in claim 8, wherein said slots extend upwardly through the lower one-half of said cylinder.

10. The liquid-aerating pump as claimed in claim 8, in which the lowermost ends of each of said baffles terminate above the lowermost inner surface of the intake member at an elevation not less than one-half the diameter of the intake member.

* * * * *